(12) United States Patent
Weimer (10) Patent No.: US 6,571,895 B2
(45) Date of Patent: Jun. 3, 2003

(54) ELECTRICAL MACHINE, AND A DRIVE ARRANGEMENT FOR A VEHICLE

(75) Inventor: Jürgen Weimer, Euerbach (DE)

(73) Assignee: Mannesman Sachs AG, Schweinfurt (DE)

( * ) Notice: Subject to any disclaimer, the term of this patent is extended or adjusted under 35 U.S.C. 154(b) by 35 days.

(21) Appl. No.: 09/801,297

(22) Filed: Mar. 7, 2001

(65) Prior Publication Data

US 2001/0022243 A1 Sep. 20, 2001

(30) Foreign Application Priority Data

Mar. 11, 2000 (DE) .......................... 100 11 956

(51) Int. Cl.[7] .............................. B60K 1/00; H02K 5/00
(52) U.S. Cl. ................... 180/65.1; 180/65.2; 180/65.8; 322/1
(58) Field of Search ............... 180/65.2, 65.3, 180/65.4, 65.6, 65.8; 290/1 A, 1 B, 40 C; 322/1

(56) References Cited

U.S. PATENT DOCUMENTS

| | | | | | |
|---|---|---|---|---|---|
| 2,543,541 A | * | 2/1951 | Angle | ........................ | 290/1 A |
| 4,495,901 A | * | 1/1985 | Nannini et al. | ................. | 123/2 |
| 4,779,905 A | * | 10/1988 | Ito et al. | ...................... | 290/1 B |
| 4,827,147 A | * | 5/1989 | Mizushima | .................. | 290/1 A |
| 5,357,161 A | * | 10/1994 | Daniels | ........................ | 310/89 |
| 5,585,681 A | * | 12/1996 | Bitsche | ......................... | 310/54 |
| 5,678,646 A | | 10/1997 | Fliege | | |
| 6,098,735 A | * | 8/2000 | Sadarangani et al. | ...... | 180/65.2 |
| 6,133,659 A | * | 10/2000 | Rao | ............................ | 310/89 |
| 6,340,339 B1 | * | 1/2002 | Tabata et al. | ................... | 475/5 |

FOREIGN PATENT DOCUMENTS

| | | |
|---|---|---|
| DE | 199 13 450 | 9/2000 |
| DE | 199 14 894 | 10/2000 |

* cited by examiner

Primary Examiner—Brian L. Johnson
Assistant Examiner—G B Klebe
(74) Attorney, Agent, or Firm—Cohen, Pontani, Lieberman & Pavane (57) ABSTRACT

Electrical machine having an electrical component, which has a rotor component and a stator component and is arranged inside a housing. The housing has a first housing wall which surrounds the electrical component in the circumferential direction, with the housing having an accommodation space which extends radially outward from the first housing wall from the electrical component with respect to the rotation axis of the rotor component. The individual components of the power electronics for controlling the electrical machine are arranged inside the accommodation space.

25 Claims, 3 Drawing Sheets

ELECTRICAL MACHINE, AND A DRIVE ARRANGEMENT FOR A VEHICLE

BACKGROUND OF THE INVENTION

1. Field of the Invention

The present invention relates to an electrical machine having an electrical component including a rotor component and a stator component arranged in a housing, and having power electronics for controlling the machine arranged on the electrical component. The invention also relates to a drive arrangement for a vehicle having such an electrical machine arranged between the engine and the transmission.

2. Description of the Related Art

Electrical machines are generally rotating machines which use a magnetic field either on the motor principle to convert electrical energy into mechanical energy, or on the generator principle to convert mechanical energy into electrical energy.

Electrical machines of this type, which may, for example, be in the form of synchronous machines or asynchronous machines, have an electrical component which has a rotor component and a stator component. The stator component, also referred to as the stator, is generally the stationary part, while the rotor component, also referred to as the rotor, is the rotating part. Depending on the nature of the configuration of the electrical machine, the stator component comprises, for example, a laminated core which is formed from a yoke and a number of winding teeth. An electrical winding (coil) is arranged in the slots between these winding teeth. When a current flows through these windings, this produces the magnetic field of the electrical machine. The rotor component comprises, for example, a laminated core on which a number of magnets, for example permanent magnets, are arranged. Electrical machines of said type are in widespread use in the prior art, and are used in widely differing ways.

The electrical component of the electrical machine is normally arranged inside a housing, by which means it is protected against external influences and damage.

If, for example, the electrical machine is used in a drive arrangement for a vehicle, it may act, for example, as a so-called starter-generator. A starter-generator is, for example, a permanent-magnet synchronous machine which is arranged between the crankshaft of the internal combustion engine and a clutch, or a transmission, in the drive arrangement. The starter-generator first of all allows the internal combustion engine to be started. Furthermore, while driving, it can act as a generator, that is to say replacing the starter and the generator in the vehicle. The starter-generator can be connected via its housing to the internal combustion engine, or to the transmission.

Electrical machines such as the starter-generator described above are generally controlled via so-called power electronics. One example of such power electronics is that described in DE 199 13 450.2, which corresponds to U.S. Ser. No. 09/533,580, incorporated herein by reference. These power electronics comprise a power section which has a number of capacitors and a number of power semiconductors, with the power semiconductors and capacitors being connected to a power busbar system. Furthermore, the power electronics have a control unit for the power section. A high-performance microcontroller, for example, is provided as the controller. A power supply device is also provided. The power electronics are used to control the electrical component or components connected to them.

Particularly if the electrical machine is intended to be used in a vehicle, there is generally only a very small amount of space available, so that the physical dimensions of the electrical machine need to be optimized.

In the past, it has been normal practice in the vehicle industry to install the power electronics separately from the electrical component in the vehicle. In this case, the power electronics were normally mounted fixed to the vehicle. The disadvantage of this solution was, firstly, that it required a large amount of physical space. Furthermore, appropriate wiring was required for the power connections and sensor connections between the power electronics and the electrical component. The use of relatively long cables for this wiring resulted in a range of losses. If the electrical machine was configured as a starter-generator, these losses were, for example, losses in the generator mode, voltage drops during cold starting of the vehicle, problems relating to electromagnetic compatibility (EMC) and the like.

There was thus a need to avoid these disadvantages. One step to solving the problem was, for example, to arrange the previously separate power electronics for controlling the electrical machine on the electrical component, or to integrate the power electronics in that component.

One such solution is described in U.S. Pat. No. 5,678,646. This document discloses a drive arrangement for a vehicle, in particular a road vehicle. The prior-art description in this document cites a solution in which an electric motor and its electronic controller (power electronics for the motor) are integrated in a single housing. The housing in this case comprises two half-housings which can be connected to one another, with the components of the electric motor being arranged predominantly in one half-housing, and the components of the controller being arranged predominantly in the other half-housing. These two half-housings are then joined together.

This solution variant was found to have a disadvantage in that there was only ever one completed system whose individual components could not be modified for different vehicle types.

In order to avoid these disadvantages, U.S. Pat. No. 5,678,646 now describes a solution in which the electrical machine is modular. The electrical component of the electrical machine is located in one module, while the power semiconductors, and possibly parts of the control device, are accommodated in at least one further module. The individual modules are arranged axially one behind the other, and are attached to one another.

Modern power electronics, such as the electronics described in DE 199 13 450 2 cited above, have a wide range of components, some of which are quite large. Furthermore, the use of power busbar systems which, for example, are in the form of busbars, very largely dispenses with the need to connect the individual components by means of cables. One example of this is described in more detail further below within the description of the invention.

When such power electronics are used, an axial arrangement would, on the one hand, occupy a relatively large amount of physical space. Furthermore, the use of busbars makes it necessary for the individual components of the power electronics to be accommodated as close as possible to those components of the electrical component which need to be connected to them.

SUMMARY OF THE INVENTION

Against the background of the cited prior art, the present invention is based on the object of providing an improved electrical machine and an improved drive arrangement for a vehicle, in which the power electronics can be arranged on the electrical component of the electrical machine in a simple and cost-effective manner while avoiding the disadvantages cited in the prior art and while at the same time occupying only a small amount of space.

According to the first aspect of the invention, an electrical machine is provided having an electrical component which has a rotor component and a stator component and is arranged inside a housing, and having power electronics for controlling the electrical machine, which are arranged on the electrical component. According to the invention, the housing has a first housing wall which surrounds the electrical component in the circumferential direction, and has an accommodation space which extends radially outward from the first housing wall with respect to the rotation axis of the rotor component, and the individual components of the power electronics are arranged inside the accommodation space.

This configuration of the electrical machine results in a very compact and space-saving shape, with the individual components of the power electronics being arranged in the immediate vicinity of the electrical component.

The fundamental idea of the present invention is for the power electronics to be accommodated in a specific manner in the housing of the electrical component. In this case, this results in a radial arrangement of the power electronics, rather than an axial arrangement, with respect to the electrical component. This means that the component with the power electronics is accommodated in a housing which surrounds the electrical component in the electrical machine in the circumferential direction.

To this end, the invention first of all provides for the housing to have a first housing wall which surrounds the electrical component in the circumferential direction. The first housing wall has a first surface, which faces the electrical component. Furthermore, the first housing wall has a surface which faces away from the electrical component. This surface forms a first boundary wall for an accommodation space in the housing, with the accommodation space pointing radially outward from the first housing wall with respect to the rotation axis of the rotor component. The individual components of the power electronics are accommodated in this accommodation space, which is specified in even more detail in the rest of the following description.

This results in a number of advantages. Firstly, the first housing wall, which is located between the individual components of the power electronics and the electrical component, means that the individual components are physically separated from one another. This is important, for example, for cooling since, in particular, individual components of the power electronics, such as power semiconductors and the like, have to be cooled particularly well to allow them to produce their full performance. Examples relating to this will be explained in more detail further below.

Although it is possible to arrange the individual components of the electrical machine in a particularly compact and space-saving manner, a certain amount of modularity can nevertheless be ensured, since individual components of the power electronics can be matched to different conditions. Specifically, the configuration of the electrical machine according to the invention makes it possible for the individual components of the power electronics to be replaced even after assembly of the electrical machine. This is particularly advantageous for servicing and repair purposes, as well.

Furthermore, the electrical machine according to the invention requires only a small amount of physical space, even when relatively large components are used for the power electronics. The physical space can be enlarged only in the radial direction, but not in the axial direction. This is advantageous in particular when using the electrical machine according to the invention in the vehicle sector. If, for example, the electrical machine is arranged in a drive arrangement of a vehicle between the engine and a transmission, there is generally spare physical space in the radial direction of the electrical machine as a result of the geometrical configuration of the engine and of the transmission which flank the electrical machine, and which space is generally unused. This can now be made use of by the electrical machine according to the invention. The electrical machine according to the invention allows the physical space requirement to be reduced further in comparison to the drive arrangement which is known from the prior art and is described in U.S. Pat. No. 5,678,646.

Normally, electrical machines, and/or their electrical components, have a substantially circular configuration. Depending on the type of electrical machine, the rotor component rotates either inside or outside the stator component. In this case, the two components are arranged spaced apart radially with respect to the rotation axis of the rotor component. The electrical component produced in this way is surrounded by the first housing wall in the circumferential direction. The circumference of the electrical component is in this case formed by its—circular—outer boundary. The first housing wall, which is formed in the circumferential direction of the electrical component, thus has a surface which has the length of a line forming the outer boundary of the electrical component and running back from a starting point to the output point.

The width of the first housing wall is governed by the requirement and the application. Examples relating to this will be described in more detail in the rest of the description below.

As has already been mentioned, the configuration of the electrical machine according to the invention makes it possible for the distances between the individual components of the power electronics and the components of the electrical component to be further minimized. This makes it possible to achieve a higher efficiency for the electrical machine, a smaller voltage drop, in particular during starting of the electrical machine, improved electromagnetic compatibility (EMC) and the like. The arrangement according to the invention avoids the previously required power cables between the electrical component and power electronics, as well as the corresponding connections. The electrical machine can be fit in a simple manner, with less use of materials at the same time.

The invention is not limited to specific electrical machines. In fact, it can be used for all possible types of electrical machines. In this context, one may quote, for example, internal-rotor or external-rotor electrical machines, synchronous machines, asynchronous machines, permanent-magnet machines and the like. In one advantageous refinement, the electrical machine may be in the form of a starter-generator, in particular for a vehicle.

The invention can be used advantageously for electrical machines having high motor currents of more than 300 A peak.

The electrical machine can be completely prefabricated.

The power electronics may have components which are described, for example, in DE 199 13 450.2, cited initially, so that the disclosure content and description in that document also relate to the present invention.

The housing may advantageously have a second housing wall which extends radially outward at an angle, preferably at right angles, from the first housing wall in order to bound the accommodation area. The individual housing walls are used firstly for attachment of individual power electronics components. Furthermore, if the materials are chosen appropriately, they can be used to dissipate the heat losses produced in the power electronics components. The invention is not limited to specific embodiments relating to how the two housing walls can be connected to one another or aligned with respect to one another.

In a further refinement, the accommodation area can be bounded by at least one cover element on its side opposite the first housing wall and/or on its side opposite the second housing wall. The cover element or elements can advantageously be arranged to be detachable. In this way, the individual power electronics components can be mounted very easily in the accommodation area of the housing. The accommodation area can then be sealed by the cover element or elements on the sides which are still exposed. The installed power electronics are thus covered, so that they are protected against external influences, such as the ingress of water or dirt, and against damage.

The cover element or elements can advantageously be configured such that it or they seal or seals the contours of a component (for example an internal combustion engine) on which the housing of the electrical machine is mounted, so that no particles whatsoever can enter the accommodation area of the housing via this joint either.

One or more cooling openings can advantageously be provided in the first and/or second housing wall. Additional cooling can be produced via these cooling openings, by means of an air flow driven by the rotor component. The individual cooling openings preferably have suitable devices to prevent dirt particles or the like from being able to enter the power electronics. Such devices may be, for example, seals, for example labyrinth seals, filters or the like.

Furthermore, one or more cooling channels can be provided in the first and/or second housing wall. A suitable cooling medium can flow through these cooling channels to allow heat losses which are produced to be dissipated reliably and as completely as possible. In particular, the cooling medium flowing through the cooling channels can be used to dissipate those heat losses which are produced in the power electronics components connected to the housing walls. For this purpose, the cooling channels are arranged in particular in those areas of the housing walls in which the corresponding power electronics components are also mounted.

In a further refinement, one or more openings and/or recesses can be provided in the first and/or second housing wall and/or in at least one cover element.

The openings, or recesses, firstly have the task of making it easier to fit and adjust individual power electronics components in the accommodation area. For example, it is thus possible to retighten screw connections, via which individual power electronics components are connected to one another, by inserting appropriate tools through the openings or recesses, without having to open the housing.

The openings/recesses also offer the capability, however, for various sensors to be connected to the electrical component, or external components to be connected to the power electronics. For example, it is important to know the temperature of the rotor component. Appropriate rotor temperature sensors are provided for this purpose. If the electrical machine is an external-rotor machine, the rotor temperature can be sensed without making contact using optical methods (infrared sensors) or the like, for example. If the electrical machine is an internal-rotor machine, with the stator component being located outside the rotor component, appropriate temperature sensors can be connected to the stator windings. The temperatures measured on the stator windings make it possible to deduce the rotor temperature. The values recorded by the individual sensors are transported via the openings/recesses which are provided to the power electronics, where they are processed further.

Further openings/recesses can be provided to identify the rotation speed and/or rotation angle of the rotor component. Sensors such as this are generally referred to as rotor position sensors.

The openings/recesses may, of course, also carry out other functions, for example being used to produce connections between individual power electronics components and individual components of the electrical components.

The power electronics may advantageously have one or more capacitors which is or are arranged on the first and/or second housing wall. In this case, the capacitors can be arranged at any desired points on the first and/or second housing wall, depending on the number of them and the application. The capacitors can be connected to the housing wall via a suitable connection, for example a screw connection. This means that the capacitors rest directly on the housing wall, thus forming a contact surface between the capacitor and the housing wall, via which, for example, heat losses produced in the capacitors can be dissipated.

Furthermore, the power electronics may have one or more power semiconductors which is or are arranged on the first and/or second housing wall. Once again, heat losses produced in the power semiconductors can be emitted to the housing wall, and dissipated via it, via the direct contact surface between the power semiconductor and the housing wall.

All types of power semiconductors are possible. Suitable power semiconductors are, preferably, MOSFETs, IGBTs or the like. The power semiconductors are chosen on the basis of the power requirements for the power electronics.

The configuration of the power electronics is very heavily dependent on the voltage level required. For this reason, the number of capacitors and power semiconductors can vary depending on the design of the power electronics, so that the invention is not limited to a specific number of capacitors and power semiconductors.

The power semiconductors can preferably be arranged via a clamping connection on the first and/or second housing wall. Such a connection can, firstly, be implemented very easily, with a very good clamping effect being produced at the same time. If the power semiconductors are pressed via such a clamping connection onto the housing wall, this connection results in only a low thermal resistance.

In one advantageous refinement, the power semiconductors can be arranged on the first housing wall, with the first housing wall being made planar in this area. The first housing wall normally has a contour which follows the curved shape of the electrical component, so that the individual power semiconductors have to be mounted on this curved housing wall. In order to simplify the attachment of the power semiconductors and in order at the same time to produce a contact surface which is as large and flat as possible between the power semiconductors and the housing wall, the housing wall is made planar in those areas in which the power semiconductors are mounted on it.

An analogous situation likewise applies to the arrangement of the capacitors or of other components of the power electronics on the first housing wall.

The power electronics can advantageously have a power busbar system—also referred to as a busbar. Individual components of the power electronics, for example the capacitors and power semiconductors, are connected to the power busbar system, and are interconnected via it. The connection can be produced via suitable screw connections. The power semiconductors can advantageously be connected to the power busbar system via connecting legs provided on them, for example via a suitable connecting lug or the like. The power busbar system is preferably composed of copper.

Furthermore, the power busbar system can advantageously be connected to one or more connecting contacts for the stator component. The connecting contacts can in turn be connected to a corresponding interconnection arrangement for the windings of the stator component. In order to split the current better, the interconnection arrangement can be connected to the power busbar system at a number of points. The power busbar system can be connected to the connecting contacts via, for example, a suitable screw connection, plug-in connection or the like.

The interconnection arrangement for the stator windings of the stator component may be in the form of annular conductors. This avoids any need for individual interconnection of the respective stator coils to the connecting contacts and thus to the power busbar system. Connecting conductors which are electrically insulated from one another are used instead, are configured as ring conductors and are arranged interleaved radially inward with respectively different diameters. The individual coil ends are connected to the connecting conductors at the respective points provided for this purpose. This drastically reduces the number of connecting contacts which are required and need to be connected to the power busbar system.

The power electronics may advantageously have a drive device for the power semiconductor or semiconductors. This drive device, which is, for example, in the form of a drive board or the like, is preferably used for supplying signals to the power semiconductors. In this case, the control connections of the semiconductors, for example the gate of a field-effect transistor, make contact with the drive device. The drive device may in turn have a number of openings and/or recesses through which the connecting legs of the power semiconductors can be passed in order to be connected to the power busbar system. In this way, the drive device can be mounted in a particularly space-saving manner between the power busbar system and the power semiconductors.

Furthermore, the power electronics may have a control device. The control device, which may be a control board, is preferably designed using SMD technology and carries all the control, monitoring and regulation functions for the power electronics, including driving the power semiconductors. A high-performance microcontroller is preferably provided to carry out the control functions in the control device, with all the functions preferably being predetermined via a CAN bus. Furthermore, the control device preferably has a device for the electrical power supply. In addition, at least one connecting element can be provided, which is advantageously a signal plug connector or the like. Depending on the requirements and the application, the control device may have further elements.

The control device is preferably connected to the drive device. In one particularly advantageous refinement, the control device and the drive device can be in the form of a single component.

The power busbar system and/or the drive device may preferably be in the form of a busbar. As a rule, busbars are used to connect electrical components to one another and to supply them with the necessary electrical power.

The power busbar system and/or the drive device may advantageously have a current measurement device. This current measurement device, which is also referred to as a current sensor, may either be in the form of an integral component (for example when the power busbar system and/or the drive device are in the form of a busbar), or may be a separate component.

The power electronics are used to drive the electrical component of the electrical machine. High currents therefore flow through the power electronics while it is operating, and these need to be measured in order to control and monitor the electrical machine. Current measurement devices generally comprise a sensor and an evaluation device connected to it.

One particularly advantageous option for current measurement is described DE 199 14 894, which corresponds to U.S. Ser. No. 09/538,653, now U.S. Pat. No. 6,380,728, incorporated herein by reference. The busbar described in that document has at least one subarea with a formed-out region. This subarea may have a special configuration and may have one or more slots in order to subdivide the current-carrying paths. This allows the current-carrying paths to be interrupted within the busbar, allowing the current flowing through the busbar to be diverted in a desired direction. A sensor for a current measurement device is advantageously provided in the vicinity of the subarea used for current measurement. This sensor, which may be designed, for example, for measuring an electrical and/or magnetic field in the busbar, is in turn connected to an evaluation device. The sensor and/or the evaluation device may advantageously, but not necessarily, be provided in the control device for the power electronics which, in this case, is preferably provided underneath the respective busbar. DE 199 14 894 describes not only a current sensor but also a particularly advantageous busbar.

The housing may advantageously have at least one cable connection for electrical connection of the power electronics to external components. Such external components may, for example, be in the form of a vehicle on-board electrical power supply system, and they will be explained in more detail in conjunction with the second aspect of the invention.

The housing may likewise have at least one cooling connection for connection to a cooling device. This cooling connection is used to control the flow of a cooling medium to and away from the electrical machine, in particular by means of the cooling channels described further above.

A fixing device can preferably be provided for at least temporarily fixing the housing on the electrical component. Such a fixing device is particularly worthwhile when the electrical component of the electrical machine is not included within any housing which entirely surrounds the electrical machine. If, for example, the electrical machine is arranged between a vehicle engine and a transmission or the like, all that is necessary is for the housing of the electrical machine to shield this in the radial direction, since, in cases such as this, the housing is normally connected, for example screwed, to the engine and to the transmission or the like. In order to allow the electrical machine to be completely prefabricated, an appropriate fixing device must therefore be provided by means of which the housing is attached to the electrical component until the installation in the drive arrangement has been completed. The invention is not limited to specific fixing devices. For example, fixing can be achieved using suitable fixing plates and fixing screws.

The width of the housing is advantageously matched to the width of the electrical machine. This width is substantially governed by the width of the electrical component, that is to say the width of the rotor component and the stator component, as well as the accessories required for them. If, for example, the electrical machine is used as a starter-generator for a vehicle, situations can occur in which the coupling or clutch required for such a vehicle, or at least parts of it, is or are likewise arranged in the region of the electrical component. This means that a unit such as this comprising an electrical machine and coupling or clutch has a somewhat greater width than would be the case with an electrical machine without a coupling or clutch. In this situation, the width of the housing must be adapted in an appropriate manner.

The housing may advantageously be in the form of a connecting flange. In this case, the connecting flange is a "housing element" which shields the electrical machine in the radial direction. The connecting flange is connected via suitable connecting means, for example screws or the like, to further components, for example to an engine and to a transmission in a drive arrangement for a vehicle. The end faces of the electrical machine are then covered via corresponding end faces of the further components, for example the end face of the engine and the end face of a transmission or the like.

According to a second aspect of the invention, a drive arrangement is provided for a vehicle, in particular for a road vehicle, having an engine and a transmission connected downstream from the engine, with an electrical machine according to the invention, as described above, provided between the engine and the transmission.

The drive arrangement according to the invention makes it possible for the electrical machine to be integrated in the drive arrangement for the vehicle while occupying as little space as possible.

The housing of the electrical machine may advantageously be in the form of a connecting flange, which is connected on one side to the engine and on the other side to the transmission. This allows the electrical machine (that is to say the electrical component with the power electronics and, possibly—as indicated above—a coupling or clutch) to be completely preassembled and to be fit as a unit during vehicle manufacture.

It is particularly advantageous for the electrical machine to be in the form of a starter-generator. This is an electrical machine which is used not only for starting and stopping the engine but which can also carry out various functions during engine operation, for example braking functions, booster functions, battery management, active vibration damping, synchronization of the engine or the like.

The power electronics of the electrical machine can advantageously be connected to the vehicle on-board electrical power supply system. In this case, the invention is not limited to specific on-board power supply systems. For example, it is thus possible for the power electronics to be connected to a 14-volt on-board electrical power supply system, to a 28-volt on-board power supply system, or to a 42-volt on-board power supply system such as that which is now being introduced. The 42-volt on-board power supply system is an on-board power supply system which is being introduced for the first time by the automobile industry and which is intended to be used in the future for operating newly introduced additional electrical components, such as for windshield heating, electrical valve operation and the like.

The electrical machine can preferably be connected to a cooling device for the vehicle, in particular to a cooling circuit for the engine. In this case, the source for the cooling medium flowing through the cooling channels may be the conventional cooling circuit of the engine, for example of the internal combustion engine. The cooling connection of the electrical machine is in this case connected to the cooling circuit of the engine, so that the cooling water circulating in the engine also flows through the cooling device for the electrical machine. This means there is no need for any additional coolers, pumps or the like for the electrical component and power electronics of the electrical machine, and this has particular advantages in terms of the costs and the space requirement for the power electronics and the electrical component.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
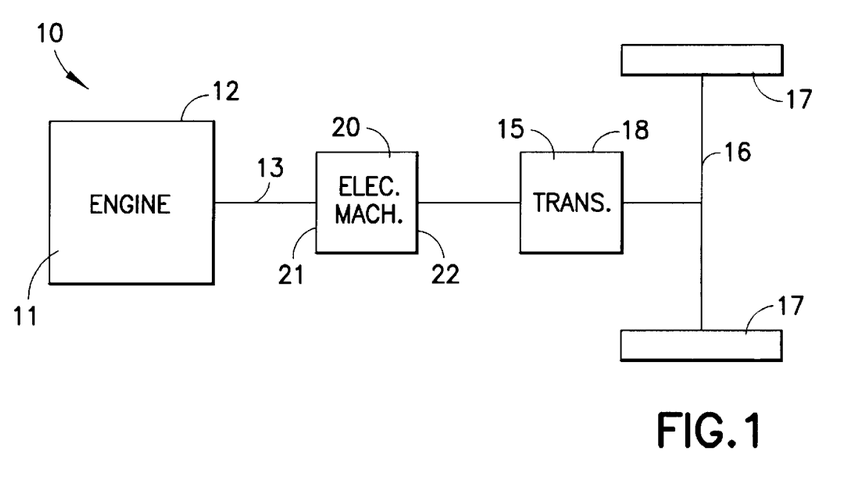
FIG. 1 shows a schematic view of a drive arrangement for a vehicle.

FIG. 1 shows a highly schematic view of an equivalent circuit for a drive arrangement 10 which is used in a motor vehicle. The drive arrangement 10 has an engine 11 which is in the form of an internal combustion engine and is located in an engine housing 12, and a transmission 15. Connected downstream from the transmission 15 is an axle gearbox (not illustrated), via which the torque which is produced is transmitted via an axle 16 to the driven wheels 17 of the vehicle. A coupling or clutch, which is not illustrated, is arranged in the drive arrangement 10 between the internal combustion engine 11 and the transmission 15.

An electrical machine 20, which in the present case is in the form of a starter-generator for the vehicle, is also located between the internal combustion engine 11 and the transmission 15. The rotor component of the electrical machine 20 is connected to a crankshaft 13 of the internal combustion engine 11. On one side 21, the electrical machine 20 is connected to the engine housing 12 while, on the other side 22, it is connected to the housing 18 of the transmission 15.

Figure 3:
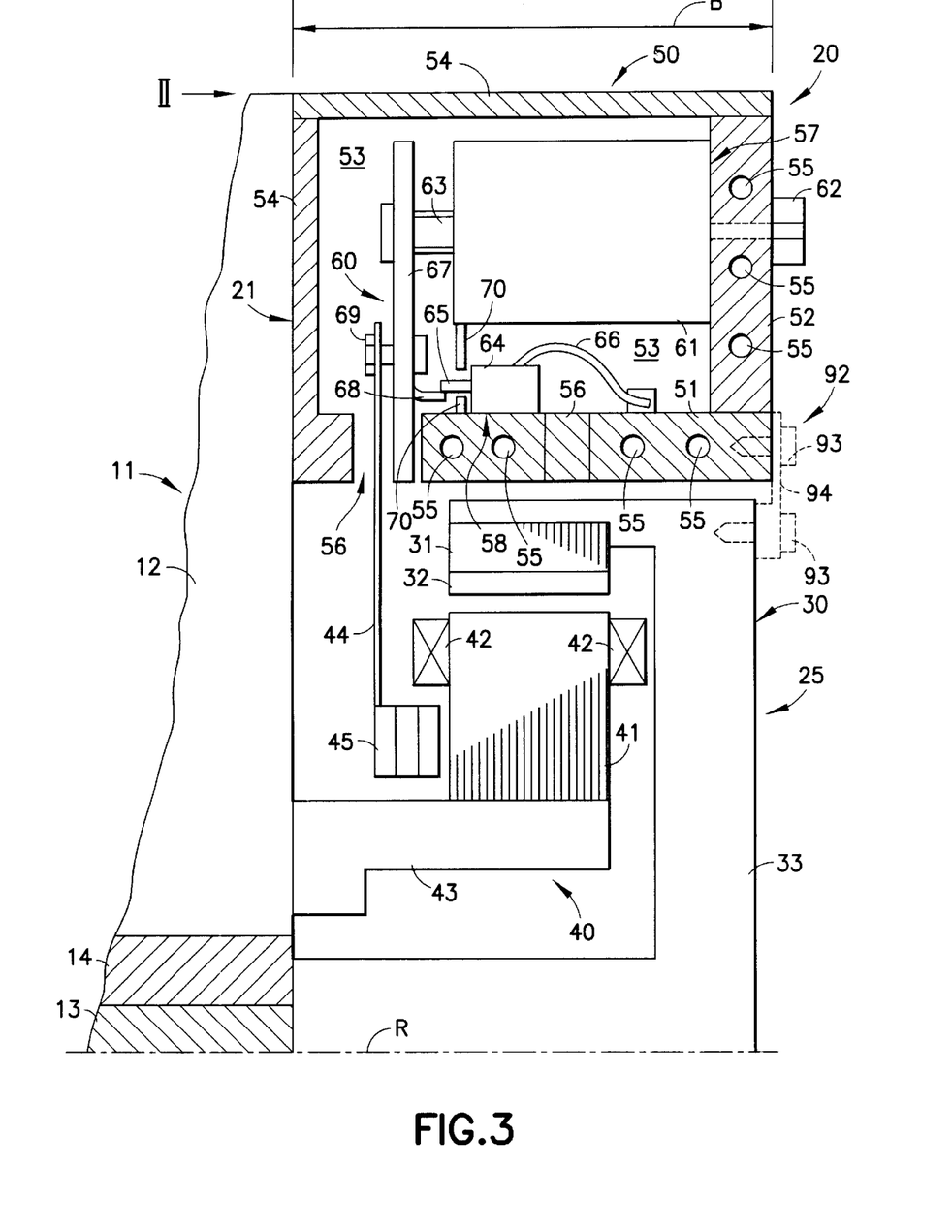
FIG. 3 shows a highly schematic cross-sectional view, not to scale, of an electrical machine according to the invention, along the section line III–III in FIG. 2.

As can be seen from FIG. 3, the electrical machine 20 first of all comprises an electrical component 25, which is in turn formed from a rotor component 30 and a stator component 40. The stator component 40 has the stator laminate 41 and stator windings 42. The stator component 40 is mounted via a stator mounting 43 on the engine housing 12 of the internal combustion engine 11. An interconnection arrangement is provided for interconnection of the stator windings 42 and, in the present exemplary embodiment, is in the form of a connector ring 45 with three annular connecting conductors.

The rotor component 30 has a rotor laminate 31 and a number of permanent magnets 32, and is connected via a rotor mounting 33 to the crankshaft 13 of the internal combustion engine 11, with the crankshaft 13 being held in a crankshaft bearing 14. The rotor component 30 rotates about a rotation axis R.

The electrical component 25 formed in this way is shielded in the radial direction by a housing 50 with a first housing wall 51 which surrounds the electrical component 25 in the circumferential direction. The housing 50 also has an accommodation area 53 which extends radially outward from the first housing wall 51 from the electrical component 25 with respect to the rotation axis R of the rotor component 30, and in which individual components of power electronics 60 are arranged. The accommodation space 53 is, furthermore, bounded by a second housing wall 52, which is at right angles to the first housing wall 51.

In order to close off the accommodation area 53 so that it is protected against the ingress of dirt particles, water and the like, two cover elements 54 are also provided, with one of the cover elements 54 being provided on the side of the accommodation space 53 opposite the first housing wall 51, and the second cover element 54 being provided on the side of the accommodation space 53 opposite the second housing wall 52. Depending on the application, only a single cover element 54 may also be provided which then has, for example, an appropriately bent contour. The cover element 54 which rests on the engine housing 12 then has the task of producing a seal to the engine housing 12, so that no particles or the like whatsoever can enter the accommodation area 53 via this joint either.

Figure 2:
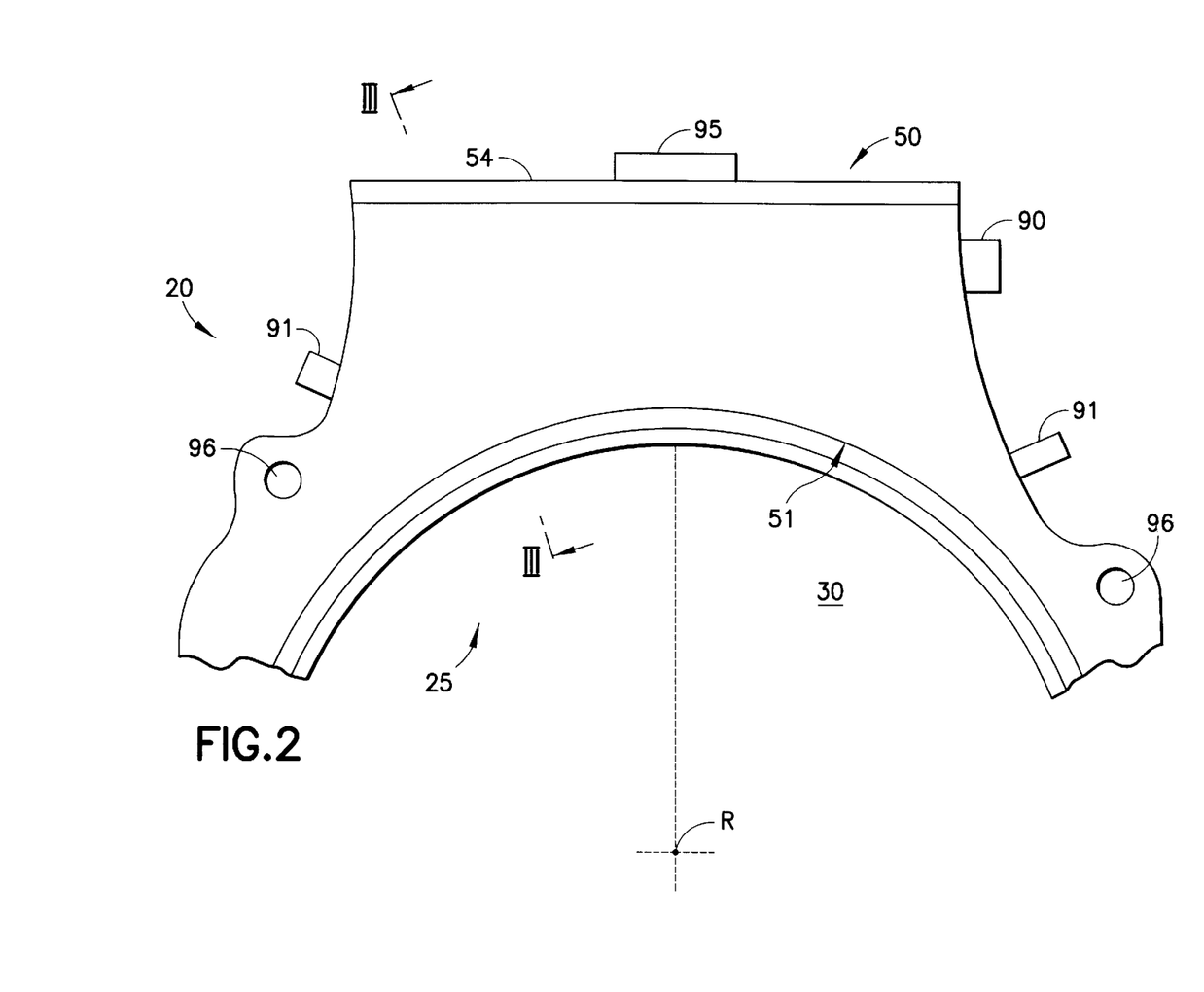
FIG. 2 shows a partial plan-view illustration of the closed housing of an electrical machine according to the invention, seen from the direction of the arrow II in FIG. 3.

As can be seen in particular from FIG. 2, the housing 50 is a connecting flange which has a number of holes 96 for connection to the internal combustion engine 11 and to the transmission 15, via which holes 96 a screw connection can be produced. The housing 50 has a number of further connections, for example a cable connection 90, a cooling connection 91 and a signal connector 95. The signal connector 95 is used to connect a control device (not illustrated) for the power electronics to external components, for example to a central controller or the like. A power busbar system 67 (see FIG. 3) for the power electronics can be connected via the cable connection 90 to peripheral components, for example to the vehicle on-board power supply system or the like. The power electronics 60, or individual components thereof, which are arranged inside the housing 50 can be cooled via the cooling connections 91. A cooling system which is already present in the vehicle can then be connected via the cooling connections 91 to a corresponding cooling device for the power electronics 60, for example for the electrical component 25.

As can also be seen from FIG. 3, the housing 50 has a width B which corresponds approximately to the width of the electrical component 25. This ensures that the housing 50 protects the electrical component 25 against the ingress of harmful particles in the width direction. On the end faces 21, 22 of the electrical machine 20, this seal is produced via the engine housing 12 and, respectively, the transmission housing 18.

In order to allow prefabricating the electrical machine 20 as a unit and only then integrating it in the drive arrangement 10 during manufacture of the vehicle, a fixing device 92 is provided which, in the present exemplary embodiment, comprises two fixing bolts 93 and a fixing plate 94. This can be used to hold together the housing 50 with the power electronics 60 located in it, as well as the electrical component 25, during transportation. Once the electrical machine 20 has been fit to the internal combustion engine 11 and to the engine housing 12, the fixing screws 93 and the fixing plate 94 are removed, so that the electrical machine 20 can then be connected to the transmission housing 18, or to the transmission 15.

The first housing wall 51 and the second housing wall 52 have a number of cooling channels 55 which are connected to the cooling connection 91 (see FIG. 2) so that a cooling medium flows through them.

A series of capacitors 61 are mounted on the second housing wall 52. In the present exemplary embodiment, they are mounted via bolts 62, so that the capacitors 61 rest against the second housing wall 52 via a contact surface 57. The heat losses produced in the capacitors 61 during operation of the power electronics 60 are transmitted via the contact surface 57 to the second housing wall 52, and are dissipated via the cooling medium flowing through the cooling channels 55. It is therefore particularly advantageous for the cooling channels 55 to be formed in the region of the contact surface 57. The number of capacitors 61 used depends on the requirement and the application. In the present exemplary embodiment, only a single capacitor 61 is shown, for the sake of clarity.

A number of power semiconductors 64 are provided on the first housing wall 51. These power semiconductors 64, which may, for example, be MOSFETs or IGBTs, are pressed against the first housing wall 51 via a clamping connection 66. The illustrated clamping connection 66 allows a particularly low thermal resistance to be achieved. The power semiconductors 64 in turn rest via corresponding contact surfaces 58 against the first housing wall 51, so that heat losses produced in the power semiconductors 64 can be transmitted and dissipated via the contact surface 58 to the first housing wall 51, and from there via the cooling channels 55. Once again, the cooling channels 55 are advantageously formed in the first housing wall 51 at the points where the power semiconductors 64 are arranged on the housing wall 51. In order to produce as large a contact area 58 as possible between the power semiconductors 64 and the first housing wall 51, the otherwise curved housing wall 51 can be made planar in that area in which the power semiconductors 64 are mounted.

The capacitors 61 and the power semiconductors 64 are connected to a power busbar system 67. In this case, the capacitors 61 are connected by bolts 63. On the other hand, the power semiconductors 64 are connected to the power busbar system 67 via respective connecting legs 65 and a contact lug 68.

A drive device 70, for example in the form of a drive board 70, is provided for supplying signals to the power semiconductors 64. The control connections of the power semiconductors 64, for example the gate of a field-effect transistor, make contact with the drive device 70. The connecting legs 65 which make contact with the power busbar system 67 pass through the drive device 70 without making contact with it. In this way, the individual components of the power electronics 60 can be arranged in a particularly space-saving manner in the accommodation space 53 of the housing 50.

The drive device 70 can preferably be connected to a control device (not illustrated) via which all the power electronics 60 are regulated and controlled. The drive device 70 and the power busbar system 67 can advantageously be in the form of busbars, in which case they can be connected to a current measurement device (not illustrated) via which the current flowing through the busbars can be measured.

The first housing wall 51 has a number of openings 56 through which individual components of the power electronics 60 can pass, various connections can be produced between the power electronics 60 and the electrical component 25, and various sensors can be connected to the electrical component 25. Sensors such as these are, for example, temperature sensors, sensors for detecting the position of the rotor component, and the like.

In the exemplary embodiment shown in FIG. 3, at least one connecting contact 44 is passed through one of the openings 56 and is connected firstly via a bolt 69 to the power busbar system 67 and secondly to the connector ring 45. This allows a particularly short connection to be provided between the individual components, resulting in the advantages mentioned in the summary.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An electrical machine comprising
an electrical component comprising a stator component and a rotor component, said rotor component being arranged to rotate about an axis of rotation,
a housing having a first housing wall which surrounds said electrical component, said housing having an accommodation space radially outside of said first wall with respect to said axis of rotation, and
power electronics for controlling said electrical machine, said power electronics comprising a power busbar system and individual components of the power electronics arranged inside the accommodation space.

2. The electrical machine as claimed in claim 1 wherein, the housing has a second housing wall which extends radially outward from the first housing wall in order to bound the accommodation space.

3. The electrical machine as claimed in claim 2, wherein, the housing further comprises at least one cover element opposite the first housing wall and opposite the second housing wall.

4. The electrical machine as claimed in claim 2 further comprising at least one cooling opening in at least one of the first and second housing walls.

5. The electrical machine as claimed in 2 further comprising at least one cooling channel in at least one of said first and second housing walls.

6. The electrical machine as claimed in claim 1, wherein, the housing has at least one opening which provides access to said accommodation space.

7. The electrical machine as claimed in claim 1, wherein, the individual components comprise at least one capacitor mounted on at least one of said first and second housing walls.

8. The electrical machine as claimed in claim 1, wherein, the individual components comprise at least one power semiconductor mounted on at least one of said first and second housing walls.

9. The electrical machine as claimed in claim 8 further comprising at least one clamping connection for clamping said at least one power semiconductor to said at least one of said first and second housing walls.

10. The electrical machine as claimed in claim 8, wherein, the at least one power semiconductor is mounted on the first housing wall, and the first housing wall is planar wherein the at least one power semiconductor is mounted.

11. The electrical machine as claimed in claim 8, wherein, the power electronics comprise a drive device for the at least one power semiconductor.

12. The electrical machine as claimed in claim 11, wherein, at least one of the power busbar system and the drive device comprises a busbar.

13. The electrical machine as claimed in one of claim 11, wherein, at least one of the power busbar system the drive device comprises a current measurement device.

14. The electrical machine as claimed in claim 1, wherein, the stator component comprises at least one connecting contact, and the power busbar system is connected to the at least one connecting contact.

15. The electrical machine as claimed in claim 1, wherein, the power electronics comprise a control device.

16. The electrical machine as claimed in claim 1, wherein, the housing comprises at least one cable connection fore electrical connection of the power electronics to external components.

17. The electrical machine as claimed in claim 1, wherein the housing comprises at least one cooling connection for connection to a cooling device.

18. The electrical machine as claimed in claim 1, further comprising a fixing device for at least temporarily fixing the housing on the electrical component.

19. The electrical machine as claimed claim 1, wherein the electrical machine has an axial width and the housing has an axial width, and wherein the width of the housing is substantially the same the width of the electrical machine.

20. The electrical machine as claimed in claim 1, wherein the housing comprises a connecting flange.

21. A drive arrangement for a vehicle, said drive arrangement comprising an engine, a transmission, and an electrical machine arranged between the engine and the transmission, said electrical machine comprising an electrical component comprising a stator component and a rotor component, said rotor component being arranged to rotate about an axis of rotation, a housing having a first housing wall which surrounds said electrical component, said housing having an accommodation space radially outside of said first wall with respect to said axis of rotation, and power electronics for controlling said electrical machine, said power electronics comprising a power busbar system and individual components of the power electronics arranged inside the accommodation space.

22. The drive arrangement as claimed in claim 21, wherein, the housing is connected on one side to the engine and on the other side to the transmission.

23. The drive arrangement as claimed in claim 21, wherein, the electrical machine is a starter-generator.

24. The drive arrangement as claimed in claim 21, wherein, the power electronics are connected to a vehicle on-board electrical power supply system.

25. The drive arrangement as claimed in claim 21, wherein the electrical machine is connected to a cooling circuit for the engine.

* * * * *